United States Patent [19]

Wannamaker

[11] Patent Number: 5,031,926
[45] Date of Patent: Jul. 16, 1991

[54] WHEELBARROW CONVERSION KIT

[76] Inventor: David D. Wannamaker, Rte. 2, Box 257 D, St. Matthews, S.C. 29135

[21] Appl. No.: 493,635

[22] Filed: Mar. 15, 1990

[51] Int. Cl.$^5$ .............................. B62B 3/02; B62B 3/12
[52] U.S. Cl. ................................... 280/47.2; 280/47.26; 280/47.31; 280/476.1; 280/62
[58] Field of Search ................ 280/47.16, 47.17, 47.18, 280/47.2, 47.24, 47.26, 47.31, 47.34, 652, 653, 654, 402, 767, 62, 476.1

[56] References Cited

U.S. PATENT DOCUMENTS

| | | | |
|---|---|---|---|
| 266,837 | 10/1882 | Johnston | 280/47.31 |
| 736,697 | 8/1903 | Cummins | 280/47.31 X |
| 1,095,145 | 4/1914 | Elterich | 280/47.2 X |
| 1,481,002 | 1/1924 | Ferris | 280/62 |
| 2,518,032 | 8/1950 | Lewis | 280/47.2 X |
| 2,728,585 | 12/1955 | Walline | 280/62 |
| 2,818,271 | 12/1957 | Saeli | 280/79.2 |
| 3,023,021 | 2/1962 | Fricke et al. | 280/47.34 |
| 4,052,079 | 10/1977 | Lehman | 280/47.2 |
| 4,620,712 | 11/1986 | Blackwell | 280/47.2 |
| 4,767,128 | 8/1988 | Terhune | 280/62 X |

FOREIGN PATENT DOCUMENTS

| | | | |
|---|---|---|---|
| 336592 | 1/1904 | France | 280/47.2 |
| 909271 | 5/1946 | France | 280/47.2 |

Primary Examiner—Andres Kashnikow
Assistant Examiner—Brian L. Johnson
Attorney, Agent, or Firm—Leon Gilden

[57] ABSTRACT

An apparatus for utilizing a wheelbarrow as a garden tractor, wherein the organization includes an elongate frame rail rotatably mounting a wheel at each end thereof. An elongate tongue is orthogonally mounted to the frame member utilizing removable pins, and wherein the frame member is secured to or adjacent "U" shaped frame supports of the associated wheelbarrow, wherein the tongue is provided with an aperture at a remote terminal end thereof for securement to a coupling hitch of an associated tractor vehicle.

5 Claims, 4 Drawing Sheets

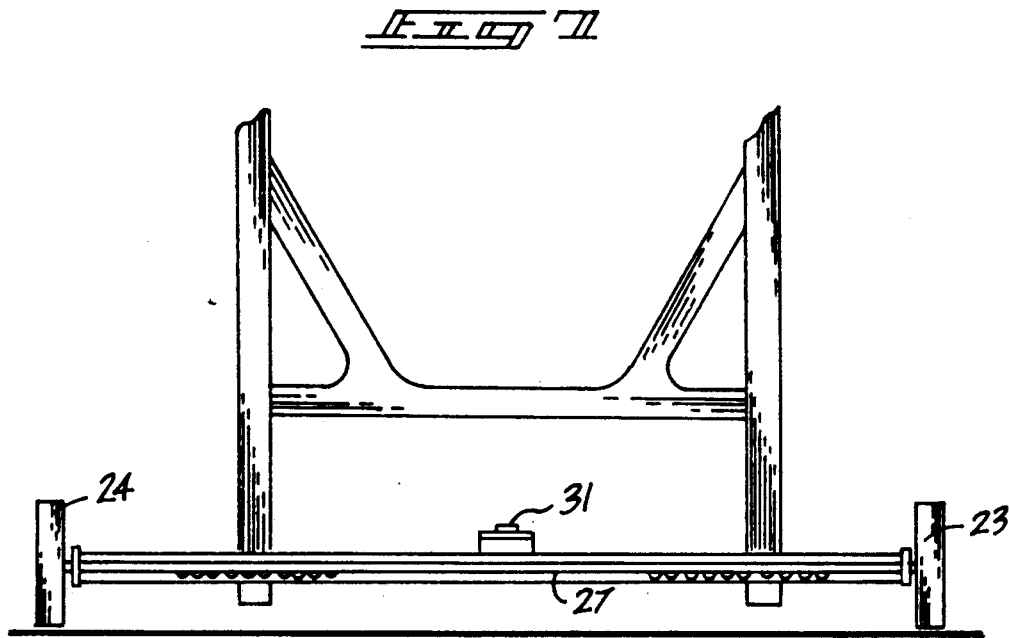
_Fig 7_
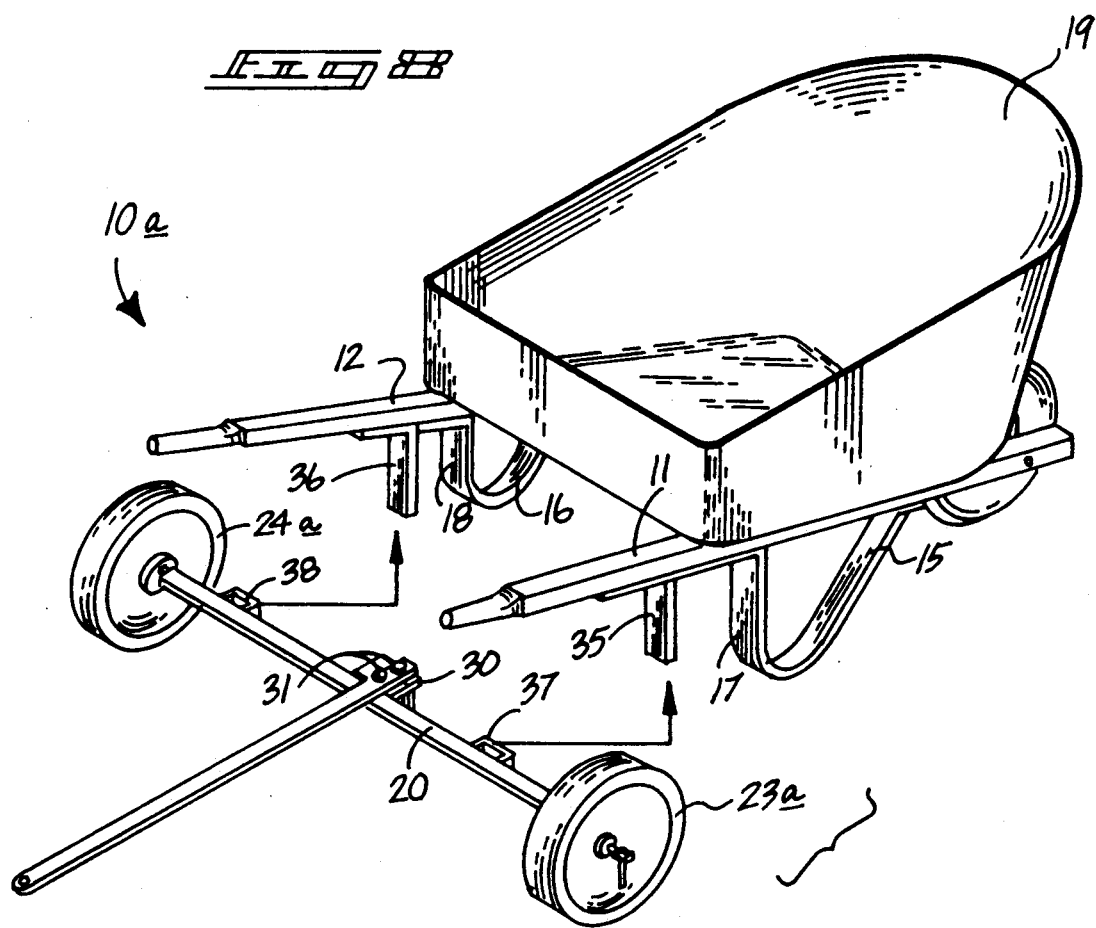
_Fig 8_

WHEELBARROW CONVERSION KIT

BACKGROUND OF THE INVENTION

1. Field of the Invention

The field of invention relates to wheelbarrow apparatus, and more particularly pertains to a new and improved wheelbarrow conversion kit wherein the same permits utilization of the organization as a garden tractor.

2. Description of the Prior Art

Wheelbarrow implements are frequently utilized in gardening and utilitarian endeavors. The prior art has provided wheelbarrow type constructions of mounted rear wheel structures to enhance stability of such organizations. Resultant organizations, however, are of a relatively awkward and bulky configuration. The instant invention attempts to overcome disadvantages of the prior art by providing a wheelbarrow construction wherein the same provides for a removable wheel dolly assembly to permit conversion of the wheelbarrow from a conventional wheelbarrow construction to a utilitarian organization as a garden cart as needed. Examples of the prior art include U.S. Pat. No. 4,767,128 to Terhune wherein a wheelbarrow construction includes a mounted rear wheel organization to provide enhanced mobility and support of the construction in use, but as in other typical prior art devices, the additional wheels provide for a construction of a more elaborate configuration than a conventional wheelbarrow.

U.S. Pat. No. 3,023,021 to Fricke, et al, providing for a garden type cart with a single pivotal rear wheel and spaced parallel forward wheels.

U.S. Pat. No. 2,728,585 to Walline sets forth a garden wheel cart with a single forward wheel and a plurality of spaced rear wheels mounted upon a single axle.

U.S. Pat. No. 1,481,002 to Ferries sets forth a support vehicle utilizing a similar three-wheel configuration as the patents set forth above.

U.S. Pat. No. 2,818,271 to Saeli sets forth a refuse container support vehicle, wherein a circular framework receives a receptacle and wherein a single pivotal wheel is mounted forwardly of a spaced axle to provide mobility to the organization.

As such, it may be appreciated that there continues to be a need for a new and improved wheelbarrow conversion kit in association with a wheelbarrow which permits convertability of the wheelbarrow of the instant invention to a garden trailer, as required.

SUMMARY OF THE INVENTION

In view of the foregoing disadvantages inherent in the known types of wheelbarrow organizations now present in the prior art, the present invention provides a wheelbarrow conversion kit wherein the same permits convertability of the wheelbarrow of the instant invention from a wheelbarrow to a garden type trailer as required. As such, the general purpose of the present invention, which will be described subsequently in greater detail, is to provide a new and improved wheelbarrow conversion kit which has all the advantages of the prior art wheelbarrow organizations and none of the disadvantages.

To attain this, the present invention provides an apparatus for utilizing a wheelbarrow as a garden tractor, wherein the organization includes an elongate frame rail rotatably mounting a wheel at each end thereof. An elongate tongue is orthogonally mounted to the frame member utilizing removable pins, and wherein the frame member is secured to or adjacent "U" shaped frame supports of the asociated wheelbarrow, wherein the tongue is provided with an aperture at a remote terminal end thereof for securement to a coupling hitch of an associated tractor vehicle.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved wheelbarrow conversion kit which has all the advantages of the prior art wheelbarrow organizations and none of the disadvantages.

It is another object of the present invention to provide a new and improved wheelbarrow conversion kit which may be easily and efficiently manufactured and marketed.

It is a further object of the present invention to provide a new and improved wheelbarrow conversion kit which is of a durable and reliable construction.

An even further object of the present invention is to provide a new and improved wheelbarrow conversion kit which is susceptible to a low cost of manufacture with regard to both materials and labor, and which accordingly is then susceptible to a low sale price to the consuming public, thereby making such wheelbarrow conversion kits economically available to the buying public.

Still yet another object of the present invention is to provide a new and improved wheelbarrow conversion kit which provides in the apparatuses and methods of the prior art some of the advantages thereof, while simultaneously overcoming some of the disadvantages normally associated therewith.

Still another object of the present invention is to provide a new and improved wheelbarrow conversion kit wherein the same provides ease of convertability of a wheelbarrow to a utility trailer.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an orthographic end view taken in elevation of the dolly mounted to the wheelbarrow framework.

FIG. 8 is an isometric illustration of a modification of the dolly structure utilized by the instant invention.

DESCRIPTION OF THE PREFERRED EMBODIMENT

Figure 1:
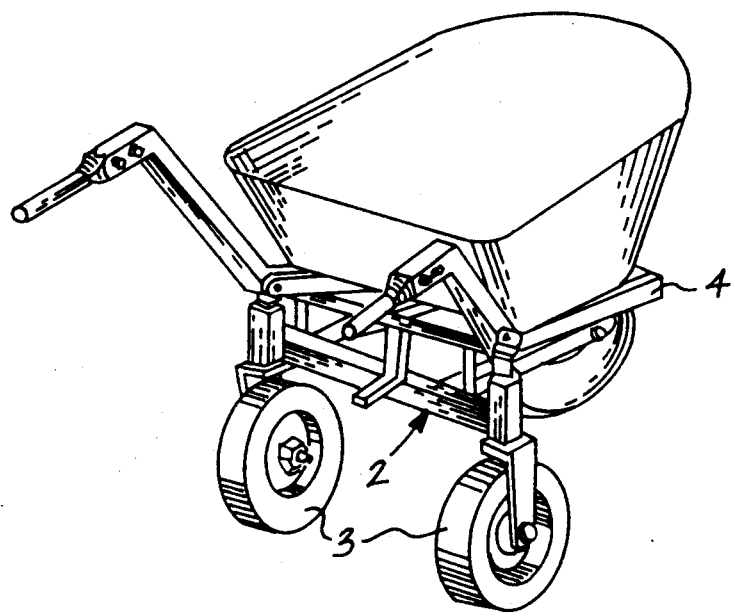
FIG. 1 is an isometric illustration of a prior art wheelbarrow organization.
Figure 2:
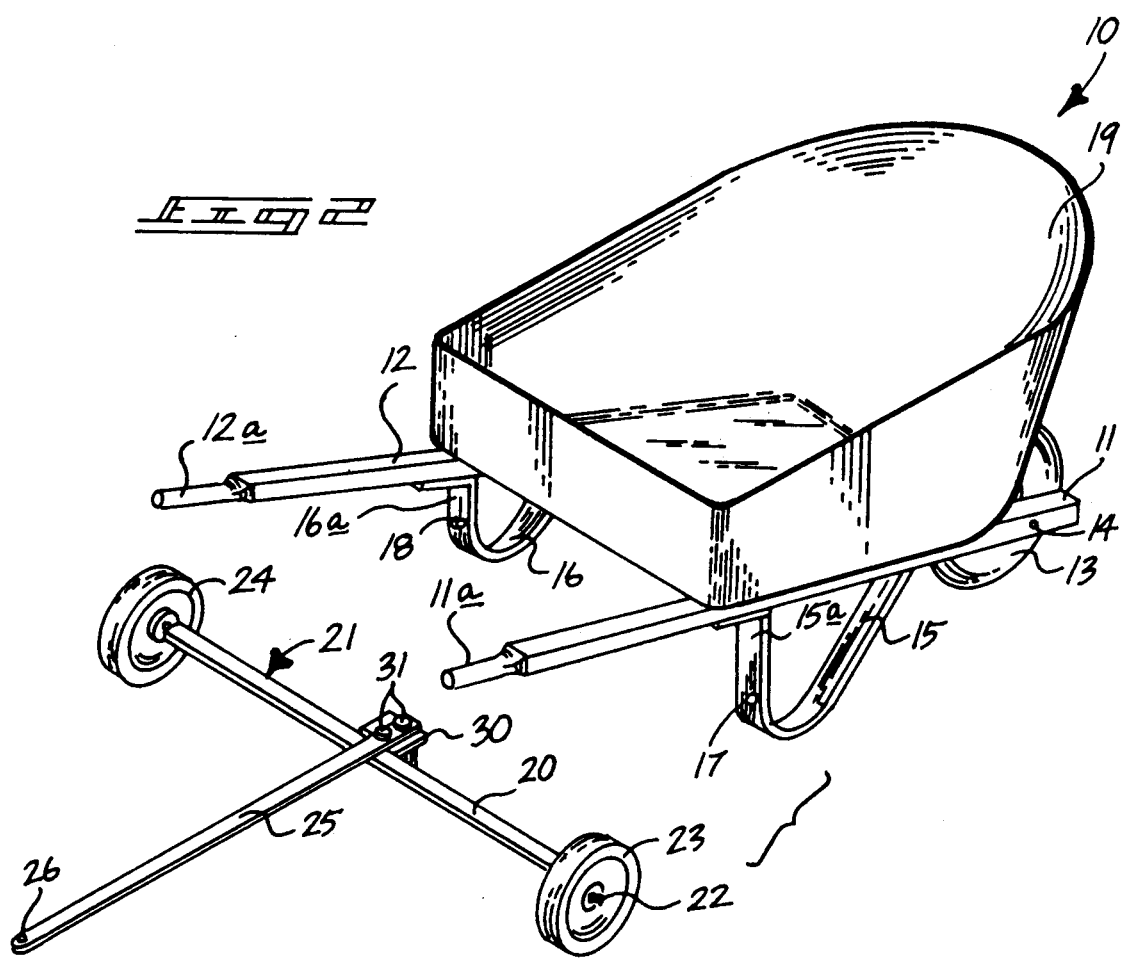
FIG. 2 is an isometric illustration of the instant invention.
Figure 3:
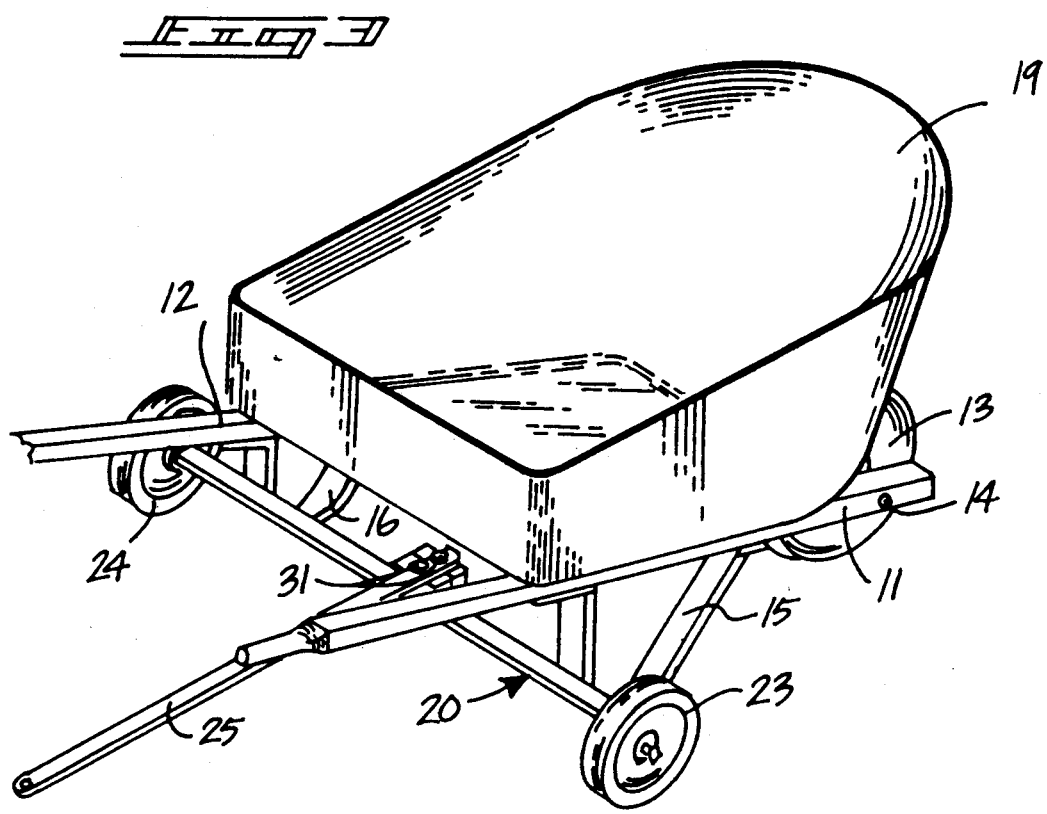
FIG. 3 is an isometric illustration of the instant invention in an assembled configuration.

With reference now to the drawings, and in particular to FIGS. 1 to 8 thereof, a new and improved wheelbarrow conversion kit embodying the principles and concepts of the present invention and generally designated by the reference numerals 10 and 10a will be described.

FIG. 1 illustrates a prior art wheelbarrow organization 1, wherein a wheelbarrow framework 2 supports a plurality of spaced rear wheels 3 mounted rearwardly of a forward wheel mounted to the framework 4.

More specifically, the wheelbarrow conversion kit 10 of the instant invention essentially comprises a wheelbarrow organization including a first elongate support arm 11 spaced from a second elongate support arm 12 angulated towards one another at their forwardmost ends to house a forward support wheel 13 therebetween mounted rotatably on a forward support axle 14. A first handle 11a and a second 12a are defined at rear terminal ends of each the support arms 11 and 12 respectively. A first "U" shaped frame 15 is mounted orthogonally underlying the first elongate support arm, with a like second "U" shaped support frame 16 mounted orthogonally underlying the second elongate support arm 12. The "U" shaped frames include a first rear vertical frame leg 15a and a second rear vertical frame leg 16a integral to the first "U" shaped support frames 15 and 16 respectively. A first support aperture 17 is orthogonally directed through the first rear vertical frame leg 15a, with a second support aperture 18 directed through the second vertical frame leg 16a. A support container 19 is integrally mounted to top surfaces of the opposed and aligned first and second elongate support arms 11 and 12 and mounted rearwardly of the forward support wheel 13 and overlying the first and second "U" shaped frames 15 and 16.

Figure 4:
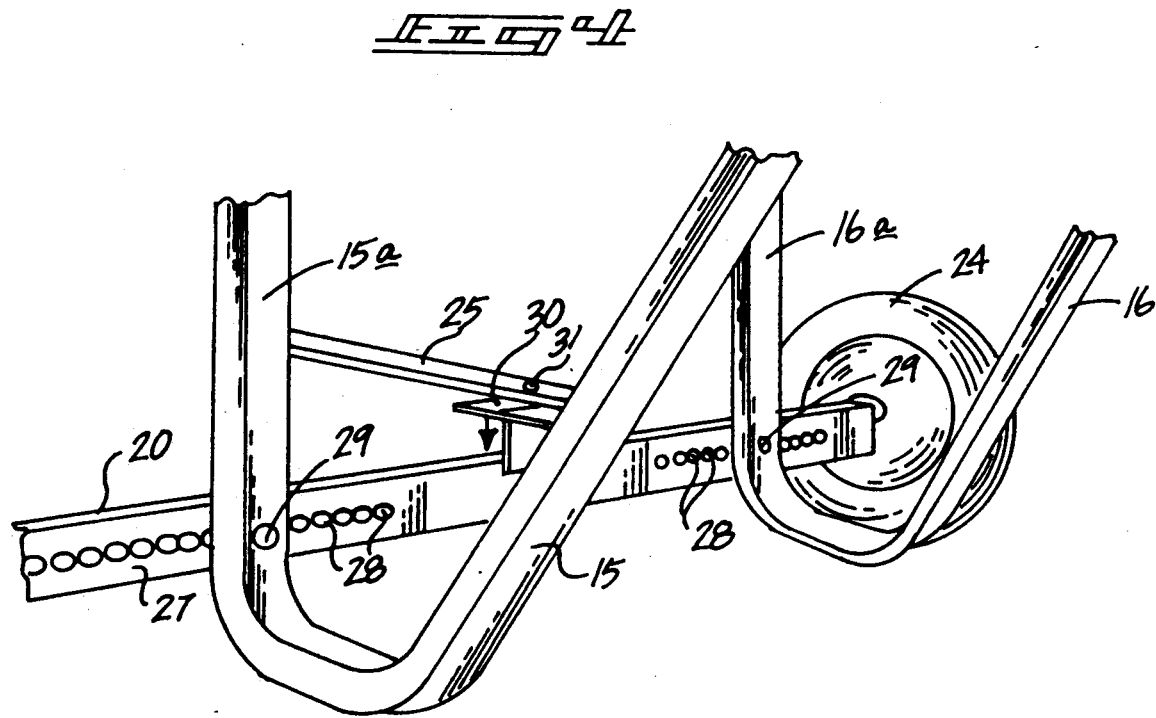
FIG. 4 is an isometric illustration illustrating the securement of the support dolly in association with the wheelbarrow of the instant invention.
Figure 5:
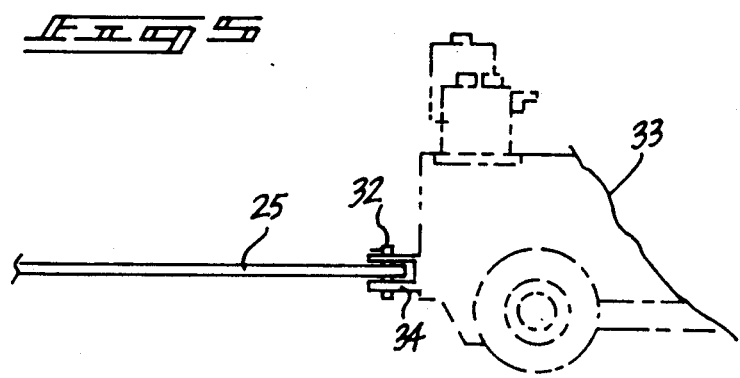
FIG. 5 is an orthographic side view taken in elevation of the elongate tongue mounted to a garden tractor.
Figure 6:
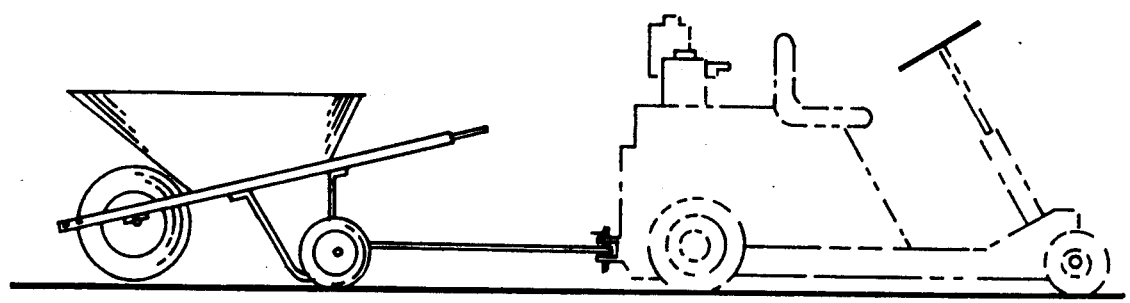
FIG. 6 is an orthographic rear view taken in elevation of the invention mounted to a garden tractor.

The carriage member 21, or dolly, utilizing coordination of the instant invention includes an elongate, "L" shaped frame rail 20, including an axle 22 mounted coextensively with the frame rail 20 to mount a respective first and second carriage wheels 23 and 24 at remote terminal ends of the frame rail. The frame rail is spaced apart a distance greater than a spacing defined between the first and second "U" shaped frames 15 and 16. Further, the first and second carriage wheels 23 and 24 are defined by a radius greater than a spacing between the first and second apertures 17 and 18 and lower terminal ends of the "U" shaped frames 15 and 16. An elongate trailer tongue 25 is integrally and orthogonally mounted to the elongate frame rail 20 medially thereof and extends forwardly of the frame rail terminating in a tongue aperture 26. A vertical rail 27 of the "L" shaped frame rail 20 includes a series of rail apertures 28 directed orthogonally through the vertical rail 27 to permit fixed association of the vertical frame rail and the "L" shaped frame rail 20 to the first and second apertures 17 and 18 utilizing fasteners 29, as illustrated in FIG. 4. A mounting flange 30 is mounted medially of the frame rail 20 with an upper surface generally parallel to and aligned with the upper surface of the frame rail 20, wherein removable flange pins 31 are directed through and adjacent a rear terminal end of the trailer tongue 25 and directed through the mounting flange 30. Reference to FIGS. 5 and 6 illustrate the use of a coupling pin 32 to couple the forward terminal end of the trailer tongue 25 to an associated tractor 33, wherein the tractor utilizes a generally "U" shaped receiving coupling 34 that captures the tongue aperture 26 therebetween utilizing the coupling pin 32.

Reference to FIG. 8 illustrates the use of a respective first and second support leg 35 and 36 mounted downwardly relative to a lower surface of the respective first support arms 11 and 12. The first and second support legs 35 and 36 are integrally formed to respective first and second "L" shaped brackets mounted to the bottom surfaces of the aforenoted support arms. The rigid support legs 35 and 36 are receivable within respective first and second sockets 37 and 38 that are mounted integrally to a rear surface of the vertical frame rail 20 to permit reception of the legs 35 and 36 therewithin. The first and second modified carriage wheels 23a and 24a are defined by a diameter substantially greater than that of the height of the "U" shaped frames 15 and 16 to extend therebelow when the modified carriage member is mounted to the wheelbarrow assembly utilizing the support legs 35 and 36. Further it should be understood that modified carriage member, as illustrated in FIG. 8, may selestively utilize either the rail apertures 28, or the sockets 37 and 38 to permit selective securement of the carriage to the legs 35 or 36 or to the rear vertical frame legs 15a and 16a of the "U" shaped frames 15 and 16.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A wheelbarrow conversion kit comprising, in combination,
   a wheelbarrow defined by a support container, the support container overlying a first and second elongate support arm, the first and second elongate support arm angulated relative to one another at forwardmost terminal ends thereof mounting a forward support wheel rotatably therebetween, and
   a first "U" shaped frame integrally mounted underlying the first elongate support arm and a second "U" shaped frame underlying the second elongate support arm, the first and second "U" shaped frames each respectively including a respective first and second rear vertical frame leg, each respective first and second rear vertical frame leg including a respective first and second support aperture directed therethrough, and
   a carriage member, the carriage member including an elongate frame rail, the frame rail including spaced terminal ends, wherein each terminal end mounts a carriage wheel rotatably thereon, and the carriage member including mounting means for selectivety mounting the frame rail to the first and second support apertures and
   wherein the frame rail comprises an elongate "L" shaped frame rail defined by a downwardly extending vertical frame rail, wherein the vertical frame rail includes a plurality of rail apertures directed therethrough, and a fastener selectively mounted through each support aperture and through a selective rail aperture to secure said carriage member to the respective first and second "U" shaped frames.

2. An apparatus as set forth in claim 1 wherein the "L" shaped frame rail includes an elongate trailer tongue, the trailer tongue including a forward terminal end with a tongue aperture directed orthogonally through the trailer tongue adjacent the forward terminal end, and the trailer tongue including a rear terminal end, and a mounting flange integrally mounted to the frame rail medially thereof, with the rear terminal end of the trailer tongue mounted to the mounting flange.

3. An apparatus as set forth in claim 2 wherein the rear terminal end of the trailer tongue includes a plurality of apertures therethrough, and a plurality of flange pins mounted to the plurality of apertures, wherein the flange pins couple the rear terminal end of the trailer tongue to the mounting flange.

4. An apparatus as set forth in claim 3 wherein the carriage wheels are defined by a predetermined radius, the predetermined radius is substantially greater than a spacing between the respective support apertures and a respective lowermost terminal end of a respective first and second "U" shaped frame.

5. An apparatus as set forth in claim 4 wherein the frame rail is defined by a predetermined length substantially greater than a predetermined length defined between the first and second "U" shaped frames.

* * * * *